United States Patent
Dederich et al.

(10) Patent No.: US 8,839,817 B2
(45) Date of Patent: Sep. 23, 2014

(54) VALVE WITH DUAL ROTATION VALVE MEMBER

(75) Inventors: Stanley S. Dederich, Batavia, IL (US); Daniel J. Goray, Gilberts, IL (US)

(73) Assignee: Schneider Electric Buildings, LLC, Loves Park, IL (US)

(*) Notice: Subject to any disclaimer, the term of this patent is extended or adjusted under 35 U.S.C. 154(b) by 815 days.

(21) Appl. No.: 13/076,170

(22) Filed: Mar. 30, 2011

(65) Prior Publication Data
US 2012/0248359 A1 Oct. 4, 2012

(51) Int. Cl.
*F16K 5/04* (2006.01)
*F16K 5/18* (2006.01)
*F16K 31/53* (2006.01)
*F16K 5/00* (2006.01)
*F16K 31/54* (2006.01)
*F16K 27/00* (2006.01)

(52) U.S. Cl.
CPC . *F16K 5/00* (2013.01); *F16K 31/54* (2013.01); *F16K 27/00* (2013.01)
USPC ................ 137/614.17; 137/614.11; 251/208; 251/309; 251/249.5

(58) Field of Classification Search
USPC ................ 137/614.11, 614.16, 614.17, 865; 251/205, 208, 209, 304, 309, 212, 248, 251/249.5
See application file for complete search history.

(56) References Cited

U.S. PATENT DOCUMENTS

| 1,306,006 | A | * | 6/1919 | Gustafson | 251/212 |
| 1,841,050 | A | * | 1/1932 | O'Stroske | 137/637.5 |
| 1,911,280 | A | * | 5/1933 | Hoffman | 137/614.11 |
| 2,482,873 | A | | 9/1949 | Roberts | |
| 2,769,456 | A | * | 11/1956 | Atkinson | 137/268 |
| 3,700,003 | A | * | 10/1972 | Smith | 137/614.17 |
| 6,609,532 | B1 | * | 8/2003 | Peterson | 137/15.18 |
| 2006/0284134 | A1 | * | 12/2006 | Dwivedi | 251/208 |
| 2010/0140522 | A1 | | 6/2010 | Chang et al. | |

FOREIGN PATENT DOCUMENTS

| JP | 59-132955 U | 9/1984 |
| JP | 2002228041 A | 8/2002 |
| JP | 2008215626 A | 9/2008 |

* cited by examiner

*Primary Examiner* — Stephen M Hepperle
*Assistant Examiner* — Frederick D Soski
(74) *Attorney, Agent, or Firm* — Reinhart Boerner Van Deuren P.C.

(57) ABSTRACT

A valve with a dual rotational valve member is provided. The valve includes a first valve member and a second valve member. An actuation arrangement is operably positioned between the first valve member and the second valve member to rotate the first valve member in a first direction and the second valve member in a second direction opposite the first direction. This counter-rotation of the first and second valve members selectively aligns or misaligns a pair of flow ports of the first valve member with a pair of flow ports of the second valve member. When the pairs of flow ports are aligned, the flow path of the valve allows for straight through flow of a fluid through the valve thereby decreasing turbulence, back pressure, and noise.

18 Claims, 9 Drawing Sheets

VALVE WITH DUAL ROTATION VALVE MEMBER

FIELD OF THE INVENTION

This invention generally relates to valve technology, and more specifically to valve members used to govern the flow of a fluid through a valve.

BACKGROUND OF THE INVENTION

Contemporary valves are used in a variety of applications to govern the flow a liquid or a gas, collectively referred to herein as a fluid. Although a particular valve design is largely dependent upon its application, a majority of valves typically include a housing that defines a flow path therethrough. A valve member is positioned within the flow path to selectively allow or prevent flow, or to govern the characteristics of flow through the valve.

Valves are often characterized by the type of valve member they incorporate. For example, a ball valve typically incorporates a spherical valve member. As another example, a butterfly valve typically incorporates a disc shaped valve member. Various other configurations are readily recognized in the art.

These valve members are typically actuated manually or automatically via a stem or the like. The stem extends from the valve member to an exterior of the valve housing. Movement of the stem results in a corresponding movement of the valve member, which ultimately dictates the flow through the valve along the flow path therethrough.

With this general construction in mind, several problems arise as a result of the valve member's position within the flow path. As one example, a particular flow path through a valve can have complex turns and bends as a result of the shape and position of the valve member within the housing. That is, the flow is not straight through the valve between an inlet and an outlet of the housing. As a result, there is an increased amount of undesirable turbulence in the flow through the valve.

As another example, the shape and placement of contemporary valve members can lead to a relatively high pressure differential across the valve, i.e. high valve back pressure. To cope with high valve back pressure, additional energy must be expended by a pump to maintain system pressure while moving the fluid through the system. Further, turbulent flow and/or high valve back pressure applications can lead to the undesirable necessity of more robust and higher cost flow sensors within the flow path to accurately sense flow through the valve.

As yet another example, the complex flow paths necessitated by various configurations of valve members can lead to an increased amount of noise due to the flow of fluid around such valve members. This is especially problematic in air flow applications such as duct work and the like.

In view of the above, there is a need in the art for a valve with a valve member that reduces or eliminates the need for a fluid to traverse complex flow paths when moving through a valve. The invention provides such a valve. These and other advantages of the invention, as well as additional inventive features, will be apparent from the description of the invention provided herein.

BRIEF SUMMARY OF THE INVENTION

In one aspect of the invention, a valve is provided that includes a valve member that allows for straight through flow through the valve to reduce turbulence, back pressure, and noise. One embodiment of a valve according to this aspect includes a housing having an inlet and an outlet with a cavity formed therebetween. An outer valve member is positioned within the cavity. The outer valve member has a pair of ports aligned about an outer valve member axis. An inner valve member is positioned within the cavity. The inner valve member has a pair of ports aligned about an inner valve member axis. This embodiment of a valve further includes an actuation arrangement formed between the outer and inner valve members. The actuation arrangement is operable to position the outer and inner valve members between a fully open position to allow fluid flow through the valve and a fully closed position to prevent fluid flow through the valve. The outer and inner valve member axes are generally transverse to one another in the fully closed position. The outer and inner valve member axes are coincident in the fully opened position.

In certain embodiments, a flow path extends between the inlet and the outlet. The flow path defines a flow path axis. The outer and inner valve member axes are coincident with the flow path axis in the fully open position.

In certain embodiments, the outer and inner valve member axes are generally transverse to one another in closed position such that an angle is formed therebetween. The angle decreases in magnitude as the valve moves from the fully open position to the fully closed position. In certain embodiments, the outer and inner valve member axes are perpendicular to one another in the fully closed position. In certain other embodiments, the outer and inner valve member axes are coincident with one another and perpendicular to the flow path axis in the fully closed position.

In certain embodiments, the outer valve member is a hollow cylinder having a bore therethrough for receiving the inner valve member. The inner valve member has an outer periphery, and the bore of the outer valve member defines an inner periphery of the outer valve member. The inner and outer peripheries are in sliding contact with one another. In certain embodiments, the housing has a valve seat and each of the outer and inner valve members has a bottom axial face. Each bottom axial face is in abutted contact with the valve seat.

In certain other embodiments, the housing carries a plate that defines a valve seat. Each of the outer and inner valve members has a bottom axial face. The bottom axial face of the outer valve member contacts the valve seat. The bottom axial face of the inner valve member does not contact the valve seat.

In another aspect, a valve having an actuation arrangement operable to rotate a pair of valve members in opposite directions is provided. An embodiment of valve according to this aspect includes a housing having an inlet and outlet with a cavity therebetween. An outer valve member is positioned within the cavity. The valve also includes an actuation arrangement having an input axis. The actuation arrangement is mechanically coupled between the outer and inner valve members such that a torque applied to the input axis causes the outer valve member to rotate in a first direction and the inner valve member to rotate in a second direction opposite the first direction.

In certain embodiments, the actuation arrangement includes a first gear ring and a second gear ring. The first gear ring is fixedly mounted to the outer valve member. The second gear ring is fixedly mounted to the inner valve member.

In certain embodiments the outer valve member has a bore extending axially therethrough. The bore defines an inner periphery of the outer valve member. The first gear ring is fixedly mounted to the inner periphery of the outer valve member. The second gear ring is fixedly mounted to a top surface of the inner valve member such that it extends axially away from the inner valve member.

In certain other embodiments, the outer valve member has a bore extending axially therethrough. The bore defines an inner periphery of the outer valve member. The first gear ring is fixedly mounted to the inner periphery of the outer valve member. The second gear ring is fixedly mounted to a bottom surface of the inner valve member such that it extends axially away from the inner valve member.

In certain embodiments, the actuation arrangement includes a first and a second pinion. The first pinion is in meshed contact with the first gear ring. The second pinion is in meshed contact with the first pinion and with the second gear ring.

In certain embodiments, application of the torque at the input axis rotates the first pinion and the first gear ring in a first direction. Application of the torque at the input axis also rotates the second pinion and the second gear ring in a second direction opposite the first direction.

In certain embodiments, a valve stem extends from the first pinion and defines the input axis such that the torque is applied directly to the first pinion. In certain other embodiments, a valve stem extends from the inner valve member and defines the input axis such that the torque is applied directly to the inner valve member.

In yet another aspect, a valve having a dual body valve member with each body having a pair of ports such that one pair of ports is selectively alignable with the other pair of ports is provided. An embodiment of a valve according to this aspect includes a housing having an inlet and an outlet with a cavity therebetween. The valve also includes an outer valve member having a pair of ports and an axial bore extending therethrough. The outer valve member is positioned within the cavity. The valve also includes an inner valve member having a pair of ports. The inner valve member is nested within the bore of the outer valve member and positioned within the cavity. The valve also includes an actuation arrangement mechanically coupled between the outer and inner valve members. The actuation arrangement is operable to selectively align and misalign the pair of ports of the outer valve member with the pair of ports of the inner valve member.

In certain embodiments, the outer and inner valve members counter-rotate to align and to misalign the pair of ports of the outer valve member with the pair of ports of the inner valve member.

In certain embodiments, a straight flow path extends between the inlet and the outlet and through the housing. The straight flow path defines a flow path axis. The flow path axis extends through each of the pair of ports of the outer valve member and each of the pair ports of the inner valve member when each pair of ports are aligned.

In certain embodiments, an opening is formed at the inlet and the outlet by alignment of each of the pair of ports with one another. The opening is centered on the flow path axis and increases in size as the valve transactions from a fully opened position to a fully closed position.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
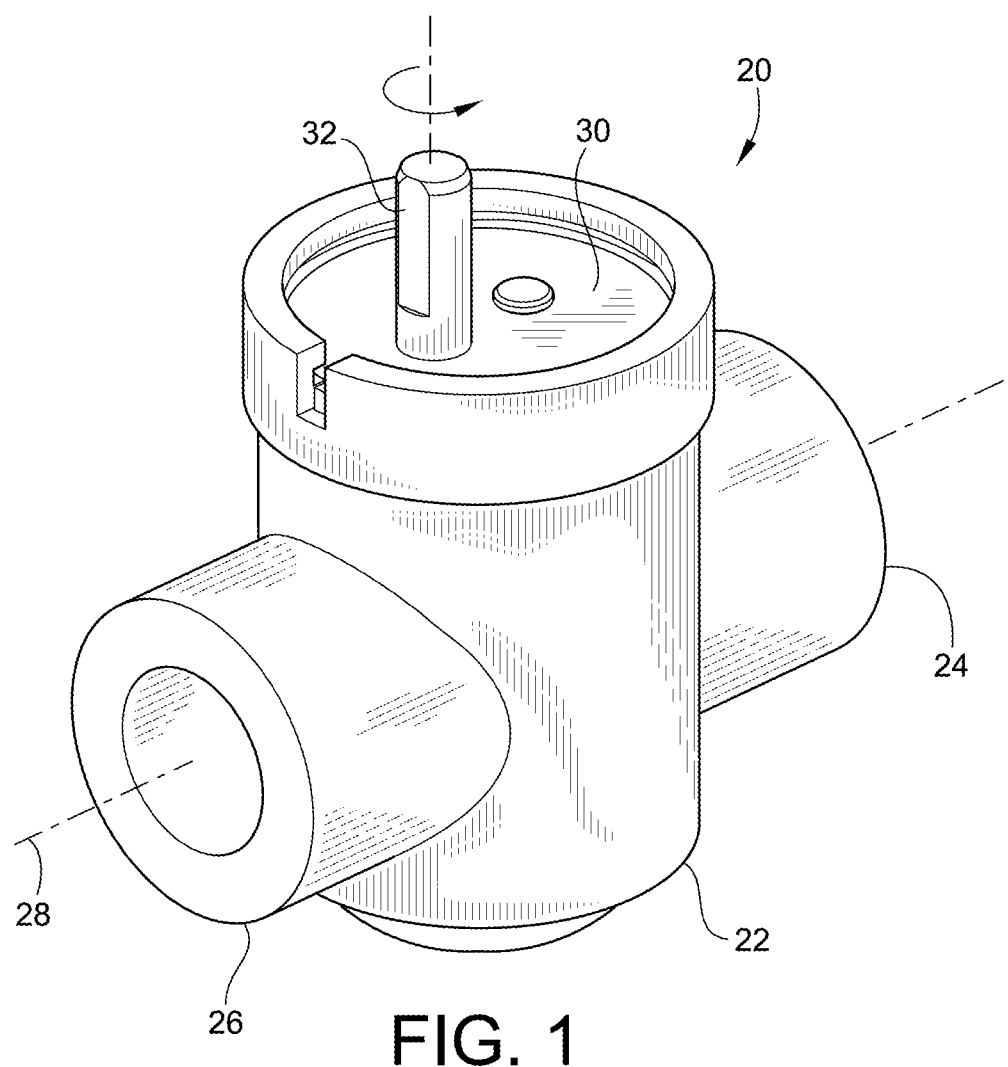
FIG. 1 is a perspective view of a first embodiment of a valve according to the teachings of the present invention.

Turning now to the drawings, there is illustrated in FIG. 1 an exemplary first embodiment of a valve 20. The valve 20 has a housing 22 that has an inlet 24 and an outlet 26. A straight flow path through the valve 20 is defined between the inlet 24 and outlet 26 and generally represented by axis 28.

A valve member arrangement and actuation arrangement are sealingly carried within the housing 22 underneath a cover 30. A valve stem 32 extends through the cover 30. The valve stem 32 is in mechanical communication with the valve member arrangement by way the actuation arrangement such that rotation of the valve stem 32 causes rotation of the valve member arrangement. As will be explained in greater detail in the following, the valve member arrangement and actuation arrangement are configured to allow for straight through flow along axis 28 through the valve 20. The stem 32 has a fluid tight seal or seals (not shown) that allow for rotation of the stem 32 relative to the cover 30 without leakage of fluid through the cover 30.

Figure 2:
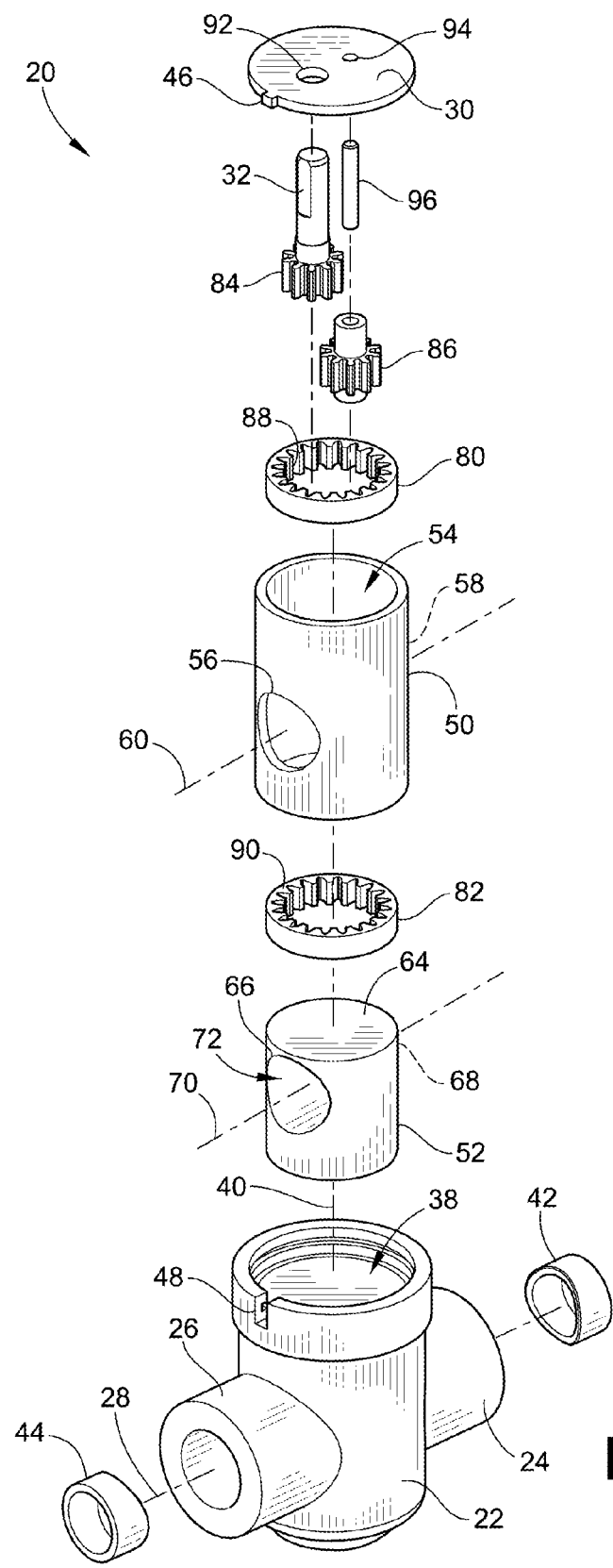
FIG. 2 is a perspective exploded view of the valve of FIG. 1.

Turning now to FIG. 2, the various structural attributes of the valve 20 including the valve member arrangement and actuation arrangement will be described. As illustrated, the housing 22 includes a cavity 38 for receipt of the inner workings of the valve 20 including the valve member arrangement and actuation arrangement. A pair of seals 42, 44 are located within the inlet 24 and outlet 26 respectively for sealingly containing the valve member arrangement and actuation arrangement within the cavity 38. These seals may be any conventional valve seal recognized in the art, and their selection does not effect the advantages of the valve 20 described herein.

The valve member arrangement includes an outer valve member 50 and an inner valve member 52. The first valve member has a generally hollow cylindrical shape that is centered on a valve member axis 40 of the valve 20. The outer valve member 50 includes a cylindrical bore 54 passing therethrough. A pair of aligned ports 56, 58 are formed through the side wall of the outer valve member 50. The ports 56, 58 are aligned along an outer valve member axis 60. Although illustrated as generally circular in shape, the ports 56, 58 can have other non-circular shapes to vary the flow characteristics through the valve 20.

The first valve member 50 is positioned within the cavity 38 adjacent to an interior wall of the housing 22. The outer valve member 50 is rotatable within the cavity 38 to selectively align and misalign the outer valve member axis 60 with the flow path axis 28.

The inner valve member 52 also has a cylindrical shape. The inner valve member 52 is sized and dimensioned to nest within the cylindrical bore 54 of the outer valve member 50 such that the outer periphery of the inner valve member 52 is in sliding contact with the inner periphery of the outer valve member 50. The inner valve member 52 also includes a pair of ports 66, 68. A bore 72 extends between the ports 66, 68 and generally defines an inner valve member axis 70. As was the case with the outer valve member axis 60, the inner valve member axis 70 is selectively rotatable to align and misalign the same with the flow path axis 28. Although illustrated as generally circular in shape, the ports 66, 68 can have other non-circular shapes to vary the flow characteristics through the valve 20.

The inner valve member 52 is nested within the bore 54 of the outer valve member 50 within the cavity 38. Although not shown, the bore 54 of the outer valve member 50, and/or the outer periphery of the inner valve member 52 can include a minor draft angle to facilitate insertion of the inner valve member 52 within the bore 54. The inner valve member 52 is positioned within the outer valve member 50 such that the ports 56, 58 of the outer valve member 50 are selectively alignable with the ports 66, 68 of the inner valve member 52. More specifically, the ports 56, 58, 66, 68 are selectively alignable such that the outer valve member axis 60 can be coincident with the inner valve member axis 70. As will be explained in greater detail below, when the outer valve member axis 60 and inner valve member axis 70 are coincident, the valve 20 is said to be in a full open position. As the outer valve member axis 60 and inner valve member axis 70 are brought out of alignment, the flow along the flow path axis 28 is restricted until it is ultimately closed off entirely. The above described selective rotation of the outer and inner valve members 50, 52 to selectively align or misalign the outer valve member axis 60 with the inner valve member axis 70 is achieved by way of the actuation arrangement as described below.

The actuation arrangement includes a first gear ring 80 and a second gear ring 82. A first and second pinion 84, 86 are mechanically coupled between the first and second gear rings 80, 82. As will be understood, the use of the identifiers "first" and "second" is used for descriptive purposes only, and not meant to limit any of these structures in their function or application, including their interaction with other components. The first gear ring 80 is fixedly mounted to the outer valve member 50 and the second gear ring 82 is fixedly mounted to the inner valve member 52. The first and second pinions 84, 86 are mechanically coupled between the first and second gear rings 80, 82 to rotate the outer valve member 50 in a first direction and the inner valve member 52 in a second direction opposite the first direction. This rotation is achieved simultaneously by way of the interconnection of the pinions 84, 86.

The first gear ring 80 has interior teeth 88. The first gear ring 80 also has a smooth outer periphery that is fixedly mounted to an interior wall of the bore 54 (i.e. the inner periphery) of the outer valve member 50. The first gear ring 80 is mounted within the bore 54 such that a top surface of the gear ring 80 is coplanar with a top surface of the outer valve member 50. In other words, the gear ring 80 is positioned at an end of the cylindrical bore 54. The first gear ring 80 is mounted within the bore 54 such that it is centered on the valve member axis 40 thus making it concentric with the bore 54.

The second gear ring 82 also includes interior teeth 90. The second gear ring 82 is fixedly mounted to a top surface 64 of the inner valve member 52. The second gear ring 82 also has a smooth outer periphery with an outer diameter generally equal to the outer diameter of the inner valve member 52. The second gear ring 82 is mounted on the inner valve member 52 such that it is centered along the valve member axis 40 thus making it concentric with the inner valve member 52.

The first pinion 84 is fixedly connected to an end of the stem 32. The second pinion 86 is fixedly mounted to a pin 96 which is in turn mounted for rotation relative to the cover 30. The stem 32 extends through a stem aperture 92 of the cover 30. The pin 96 extends through a pin aperture 94 of the cover 30. Similar to the above seals relative to the stem 32, seals can also be incorporated relative to the pin 96 to prevent leakage through the cover 30. Rotation of the stem 32 causes a corresponding rotation in the first pinion 84. The first pinion 84 is in meshed contact with the first gear ring 80. The second pinion 86 is in meshed contact and slaved to the first pinion 84. The second gear ring 82 is in meshed contact with the second pinion 86. As a result, rotation of the stem 32 causes a subsequent rotation in each of the first pinion 84, second pinion 86, first gear ring 80, and second gear ring 82.

The cover 30 is sealingly mounted to the housing 22. As illustrated, the cover 30 can include a key 46 that corresponds to a slot 48 formed proximate a top of the housing 22 to key the cover 30 to the housing. The cover 30 can be secured to the housing 22 via a seal and e-clip arrangement, or any other similar structure.

Figure 3:
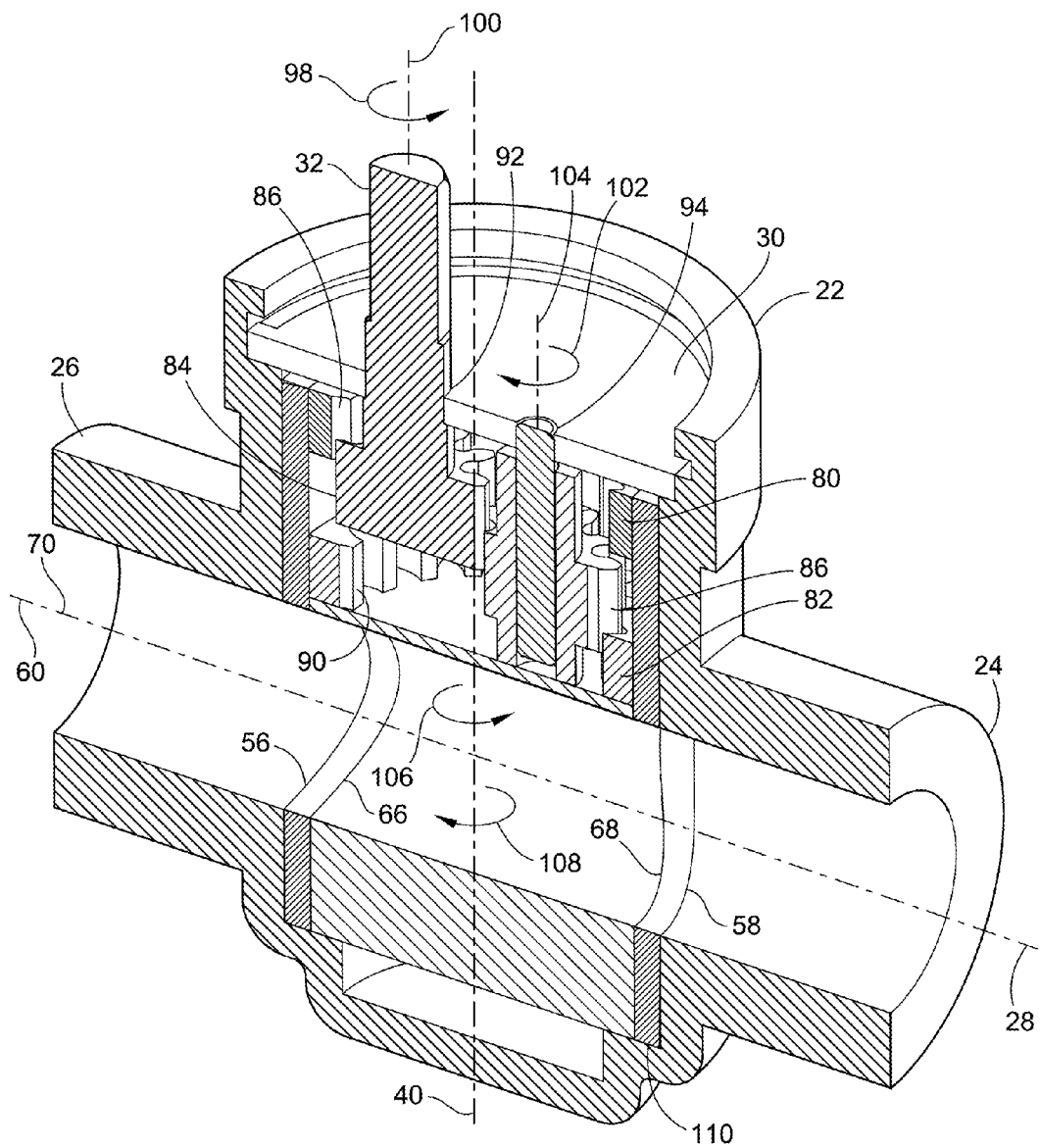
FIG. 3 is a perspective cross section of the valve of FIG. 1.

Turning now to FIG. 3, the mechanical connection between the first and second gear rings 80, 82 and first and second pinions 84, 86 will be described in greater detail. As illustrated in FIG. 3, the outer and inner valve members 50, 52 have been rotated to a full open position such that the outer valve member axis 60 is aligned with the flow path axis 28 and the inner valve member axis 70 is also aligned with the flow path axis 28.

To achieve this orientation, the valve stem 32 has been rotated in a first rotational direction 98 about an input axis 100 extending through a center of the stem 32. This rotation causes a like rotation in the first pinion 84. The second pinion 86 is meshed with the first pinion 88 such that rotation of the same causes the second pinion 86 to rotate in a second rotational direction 102 about an intermediary axis 104 passing through a center of the second pinion 86. The first pinion 84 is also meshed with the first gear ring 80 such that rotation of the same causes the first gear ring 80 rotate in a third rotational direction 106 about the valve member axis 40. It will be recognized from inspection of FIG. 3 that the first and third rotational directions 98, 106 are in the same direction. Also as illustrated, both the outer and inner valve members are positioned against a seat 110 with the cavity 38 (see FIG. 2) of the housing 22.

The second pinion 86 is also in meshed contact with the second gear ring 82 such that rotation of the same causes the second gear ring 82 to rotate in a fourth rotational direction 108 about the valve member axis 40. It will be recognized from inspection of FIG. 3 that the second and fourth rotational directions 102, 108 are the same. It will also be recognized from inspection of FIG. 3 that the third rotational direction 106 is opposite the fourth rotational direction 108 such that the outer valve member 50 rotates in an opposite direction as the inner valve member 52 to bring the valve 20 into the full open configuration illustrated in FIG. 3. As such, the outer and inner valve members 50, 52 one said to "counter-rotate."

Figure 4:
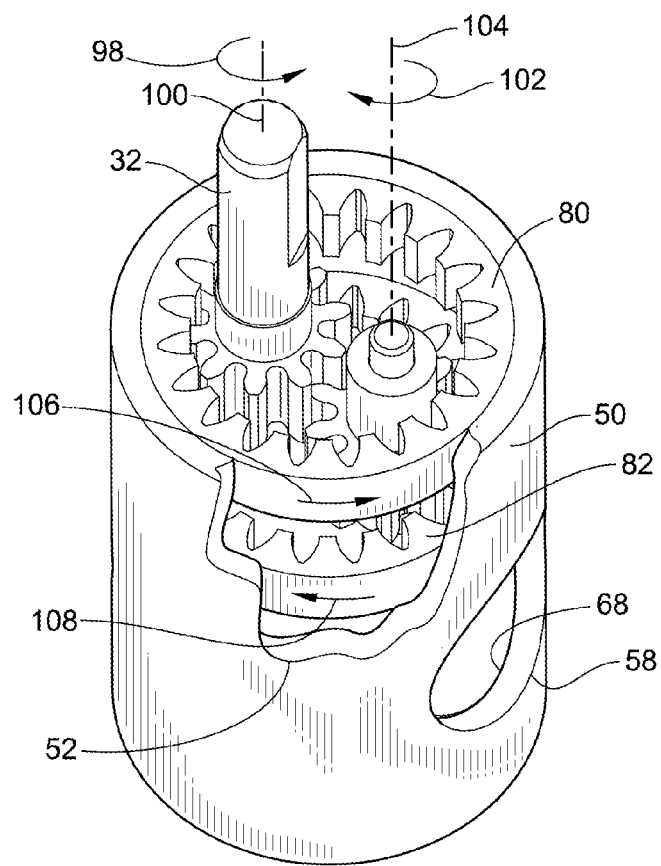
FIG. 4 is a perspective partially exposed view of a valve member arrangement and an actuation arrangement of the valve of FIG. 1.

The above described rotational relationships between the first and second gear rings 80, 82 first and second pinions 84, 86 and outer and inner valve members 50, 52 are illustrated in a top perspective view at FIG. 4. As illustrated, the first and third rotational directions 98, 106 are equivalent. Likewise, the second and fourth rotational directions 102, 108 are equivalent. The particular directions illustrated are the rotational directions required to bring the valve 20 to an open position. It will be readily recognized and appreciated that the opposite of each of the first through fourth rotational directions 98, 102, 106, 108 will bring the valve 20 from an open position to a closed position.

Figure 5:
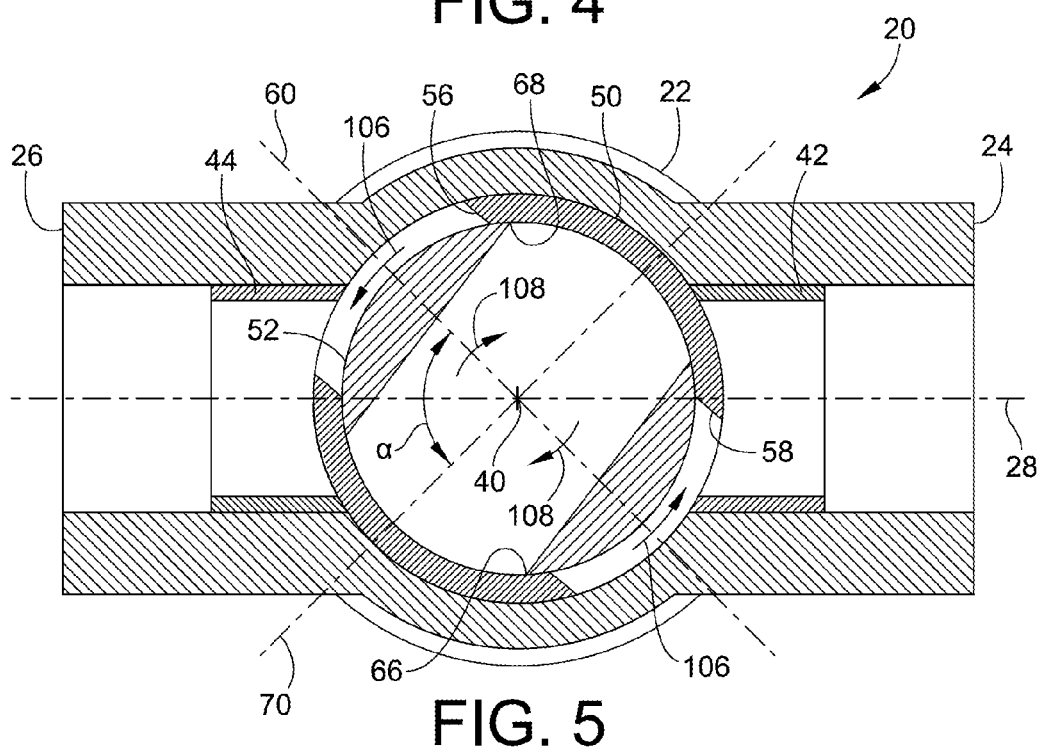
FIG. 5 is a top cross section of the valve of FIG. 1.

Turning now to FIG. 5, the orientation of the outer and inner valve members 50, 52 when in the closed position will be described in greater detail. When the valve 20 is closed, the outer valve member axis 60 and inner valve member axis 70 are generally transverse to one another and generally transverse to the flow path axis 28. Additionally, the flow port 56 of the outer valve member 50 is effectively closed off by the inner valve member 52. Likewise, the flow port 58 of the outer valve member 50 is also closed off by the inner valve member 52. In a similar fashion, the flow port 66 of the inner valve member 52 is closed off by the outer valve member 50. Likewise, the flow port 68 of the inner valve member 52 is also closed off by the outer valve member 50.

As described above, rotation of the outer valve member 50 in the third rotational direction 106 with the simultaneous rotation of the inner valve member 52 in the fourth rotational direction 108 will increasingly align the port 56 of the outer valve member 50 with the port 66 of the inner valve member 52. The same is true for the ports 58, 68 of the outer and inner valve members 50, 52 respectively. As these ports are increasingly aligned, an angle α between the outer valve member axis 60 and inner valve member axis 70 decreases, and an opening centered along the flow path axis 28 formed through the outer and inner valve members 50, 52 increases in size. It is contemplated that the particular starting angle α between the outer and inner valve member axes 60, 70 is not limited to that shown. As one example, the axes 60, 70 may be coincident with one another and perpendicular to the flow path axis 28 in the fully closed position. The particular orientation of the axes 60, 70 in the fully closed or fully opened position is governed by the positioning of the outer and inner valve members 50, 52 relative to the actuation arrangement, and thus numerous configurations are contemplated.

Figure 6A:
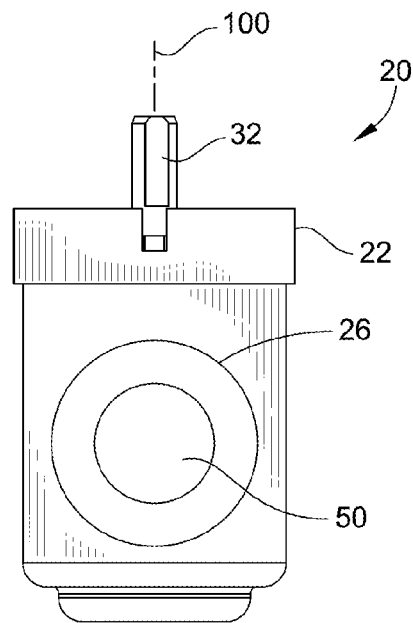
FIGS. 6A-6D are front view of the valve with the valve member shown in various positions between fully closed and fully open.
Figure 6B:
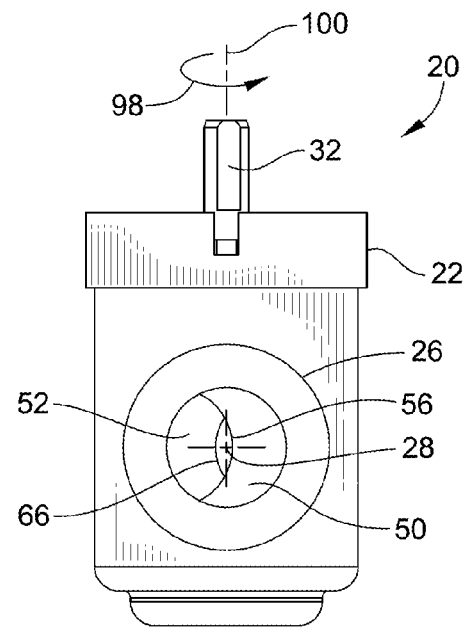

Turning now to FIGS. 6A-6D, the above described opening of the outer and inner valve members 50, 52 is shown in greater detail. With particular reference to FIG. 6A, the valve 20 is shown in a fully closed position such that the outer valve member 50 is only visible at the outlet 26 of the housing 22. Turning now to FIG. 6B, as the stem 32 is rotated in the first rotational direction 98 about the input axis 100, the outer and inner valve members 50, 52 will begin to counter-rotate such that an opening is formed and centered on the flow path axis 28.

Figure 6C:
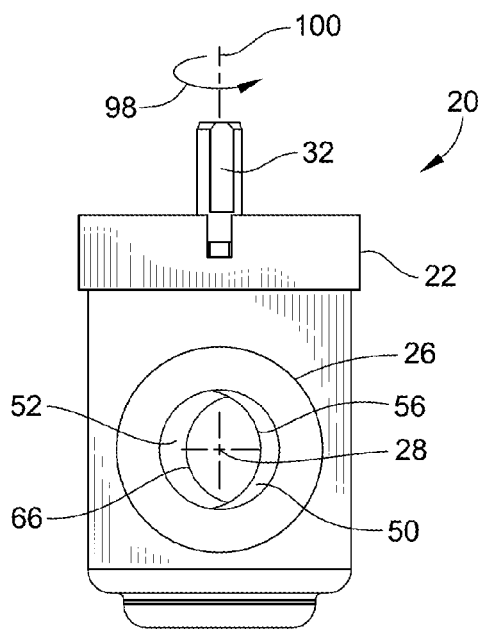
Figure 6D:
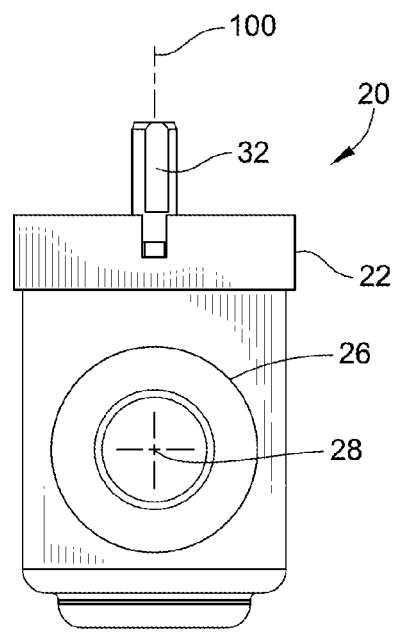

With reference now to FIG. 6C, as the rotation in the first rotational direction 98 continues, this opening will increase in size to allow a greater amount of fluid to flow straight through the valve 20 along the flow path axis 28. Turning now to FIG. 6D, the opening will increase in size until the ports 56, 58 of the outer valve member 50 (see FIG. 5) are aligned respectively with the ports 66, 68 of the inner valve member 52 (see FIG. 5). As best illustrated at FIG. 6D, this alignment generally presents a circular orifice for fluid to flow along the flow path axis 28. However, other shapes are contemplated depending on the geometry of the ports 56, 58, 66, 68.

It will be recognized from the above that the flow of fluid through the valve 20 is generally straight through the valve 20 along the flow path axis 28 and centered thereon unlike prior designs. Such a configuration advantageously presents reduced flow turbulence, back pressure, and noise when operating the valve 20. It will be readily appreciated from the above that the valve 20 may be readily applied in a wide range of fluid applications. As such, the term "fluid" is not meant to limit the valve 20 to liquid applications only. Instead, the term "fluid" is meant to encompass both liquid and gas applications, as well as fluidized solids or slurries. Indeed, the valve 20 is contemplated for use with all applications associated with valves.

Additionally, and as a result of the particular orientation of the first and second valve members 50, 52 resulting in a reduced amount of turbulence and back pressure, the valve 20 may be advantageously constructed from light weight materials such as plastics or composites. Indeed, the design described above permits the use of nonstandard materials for the construction of the valve such that the valve is not limited to brass or other metal constructions, although brass or other metals could just as easily be used to construct the valve 20 as described herein.

Figure 7:
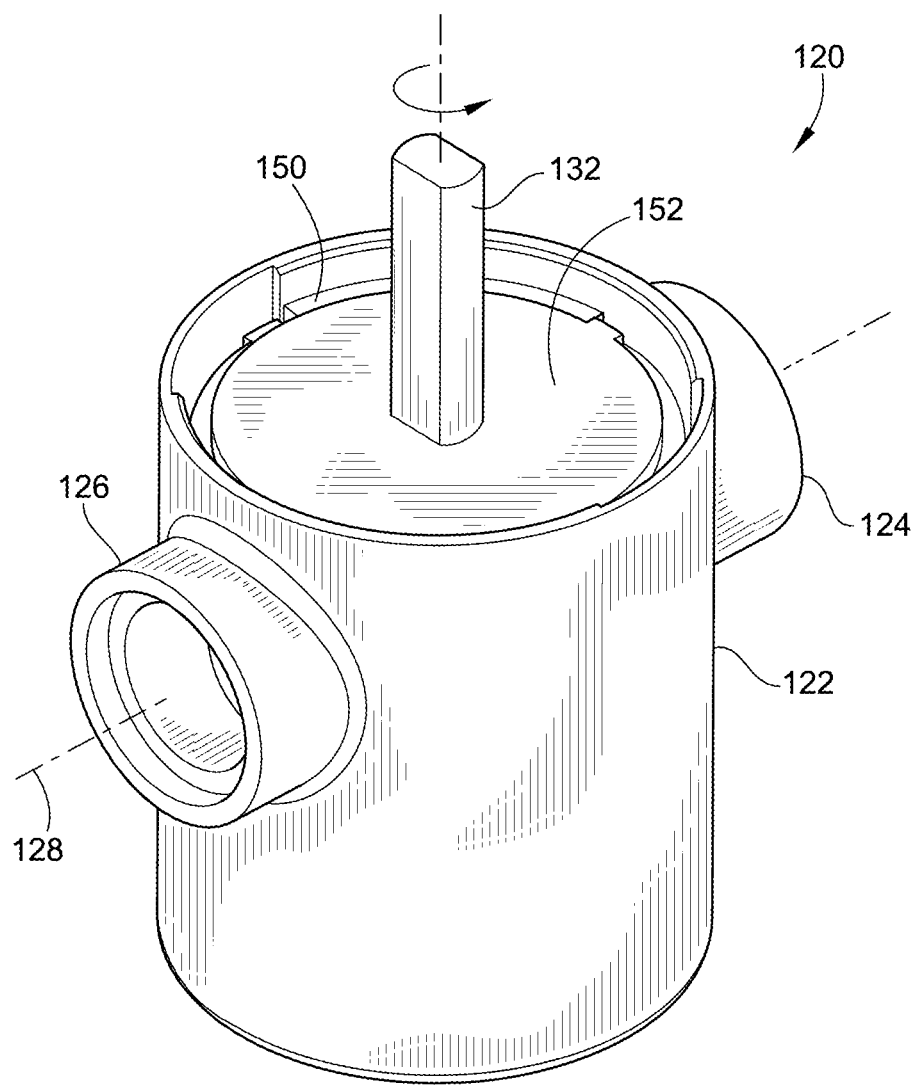
FIG. 7 is a perspective view of a second embodiment of a valve according to the teachings of the present invention.

Turning now to FIGS. 7-11, a second embodiment of a valve 120 presenting all of the above described advantages is illustrated. With particular reference to FIG. 7, the valve 120 has a housing 122 with an inlet 124 and an outlet 126. A flow path is defined between the inlet 124 and outlet 126 and is arranged along a flow path axis 128. This embodiment of a valve 120 is generally similar to the valve 20 described above with several notable differences. As illustrated at FIG. 7, the stem 132 is mounted directly to an inner valve member 152 of the valve 120. An outer valve member 150 surrounds the inner valve member 152. An actuation arrangement is formed between the outer and inner valve members 150, 152 such that rotation of the stem 132 will cause the outer and inner valve members 150, 152 to counter-rotate similar to that described above.

Figure 8:
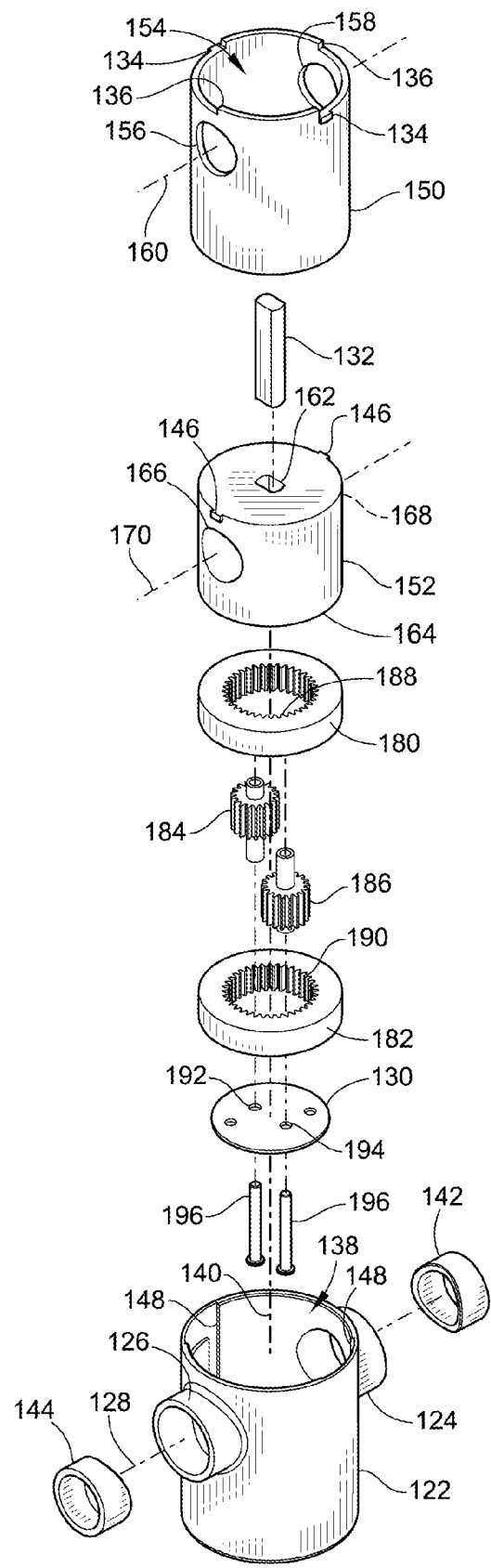
FIG. 8 is a perspective exploded view of the valve of FIG. 7.

Turning now to FIG. 8, a structural description will be provided for a valve member arrangement presented by the outer and inner valve members 150, 152 and the actuation arrangement formed therebetween. The housing 122 defines a cavity 138. A plate 130 is situated within the cavity 138 at a bottom thereof and functions as a seat for the outer and inner valve members 150, 152. The outer valve member 150 has a generally hollow cylindrical shape with a bore 154 extending therethrough. A pair of ports 156, 158 extend through a side wall of the outer valve member 150. The ports 156, 158 are aligned along an outer valve member axis 160. Similar to the above, the outer valve member axis 160 is selectively alignable with the flow path axis 128 of the valve housing 122.

The outer valve member 150 also includes a plurality of stops 134 and a plurality of abutments 136. Although multiple stops 134 and abutments 136 are illustrated, it will be recognized that fewer or greater may be provided. Each of the stops 134 prevents overtravel of the outer valve member 150 during operation by abutting against a corresponding abutment 148 formed on an inner surface of the housing 122 within the cavity 138. The abutments 148 of the housing 122 are arranged such that the stops 134 will abut the same when the outer valve member 150 is at full open or full closed.

The inner valve member 152 is cylindrical in shape and nested within the bore 154 of the outer valve member 150 within the cavity 138. Although not shown, the bore 154 of the outer valve member 150, and/or the outer periphery of the inner valve member 152 can include a minor draft angle to facilitate insertion of the inner valve member 152 within the bore 154. The inner valve member 152 includes a pair of ports 166, 168 with a bore 172 extending therebetween. The ports 166, 168 and bore 172 define an inner valve member axis 170. The inner valve member axis 170 is selectively alignable with the flow path axis 128. An aperture 162 is formed in the top of the inner valve member 152 for receipt of the stem 132. The stem 132 and aperture 162 are keyed to one another such that they are prevented from relative rotation.

The inner valve member 152 includes a plurality of stops 146 formed thereon. The stops 146 are positioned such that they will abut the abutments 136 of the outer valve member 150 when the inner valve member 152 is at full open or at full closed. From this as well as the above described relationship between the stops 134 and abutments 148, it will be recognized that the outer valve member 150 is prevented from rotating beyond its maximum positions of travel at full open and full closed relative to the housing 122, and the inner valve member 152 is prevented from rotating beyond its maximum positions of travel at full open and full closed relative to the outer valve member 150. As a result, the outer and inner valve members 150, 152 are prevented from rotation relative to the housing 122 beyond their fully opened or fully closed positions.

Similar to the previous embodiment, the actuation arrangement of the illustrated valve 120 of FIG. 8 also includes first and second gear rings 180, 182 and first and second pinions 184, 186. As will be understood, the use of the identifiers "first" and "second" is used for descriptive purposes only, and not meant to limit any of these structures in their function or application, including their interaction with other components. The first gear ring 180 includes interior teeth 188. The first gear ring 180 is mounted to a flat bottom surface 164 of the inner valve member 152. The first gear ring 180 has a smooth outer periphery with an outer diameter equal to that of the outer diameter of the inner valve member 152. The first gear ring 180 as well as the inner valve member 152 are centered along a valve member axis 140 defined by the cavity 138 such that the first gear ring 180 is concentric with inner valve member 152.

The second gear ring 182 also has interior teeth 190. The second gear ring 182 is received within the cylindrical bore 154 of the first valve member 150 at an end thereof opposite the end adjacent to the stops 134 and abutments 136. The second gear ring 182 and outer valve member 150 are also centered on the valve member axis 140 such that the second gear ring 182 is concentric with the outer valve member 150.

The first pinion is mounted for rotation relative to the plate 130 via a pin 196. The first pinion 184 is in meshed contact with the first gear ring 180 as described below. Similarly, the second pinion 186 is also mounted for rotation relative to the plate 130. The second pinion 186 is mounted to the plate 130 via a pin 196 each pin 196 extends through pin apertures 192 of the plate 130. The second pinion 186 is in meshed contact with the first pinion 184 as well as the second gear ring 182. As was the case with the above described embodiment, the first and second gear rings 180, 182 and first and second pinions 184, 186 are arranged and mechanically coupled between the inner and outer valve members 152, 150 respectively to counter-rotate the same to bring the inner and outer valve member axis 170, 160 into and out of coincidence.

Figure 9:
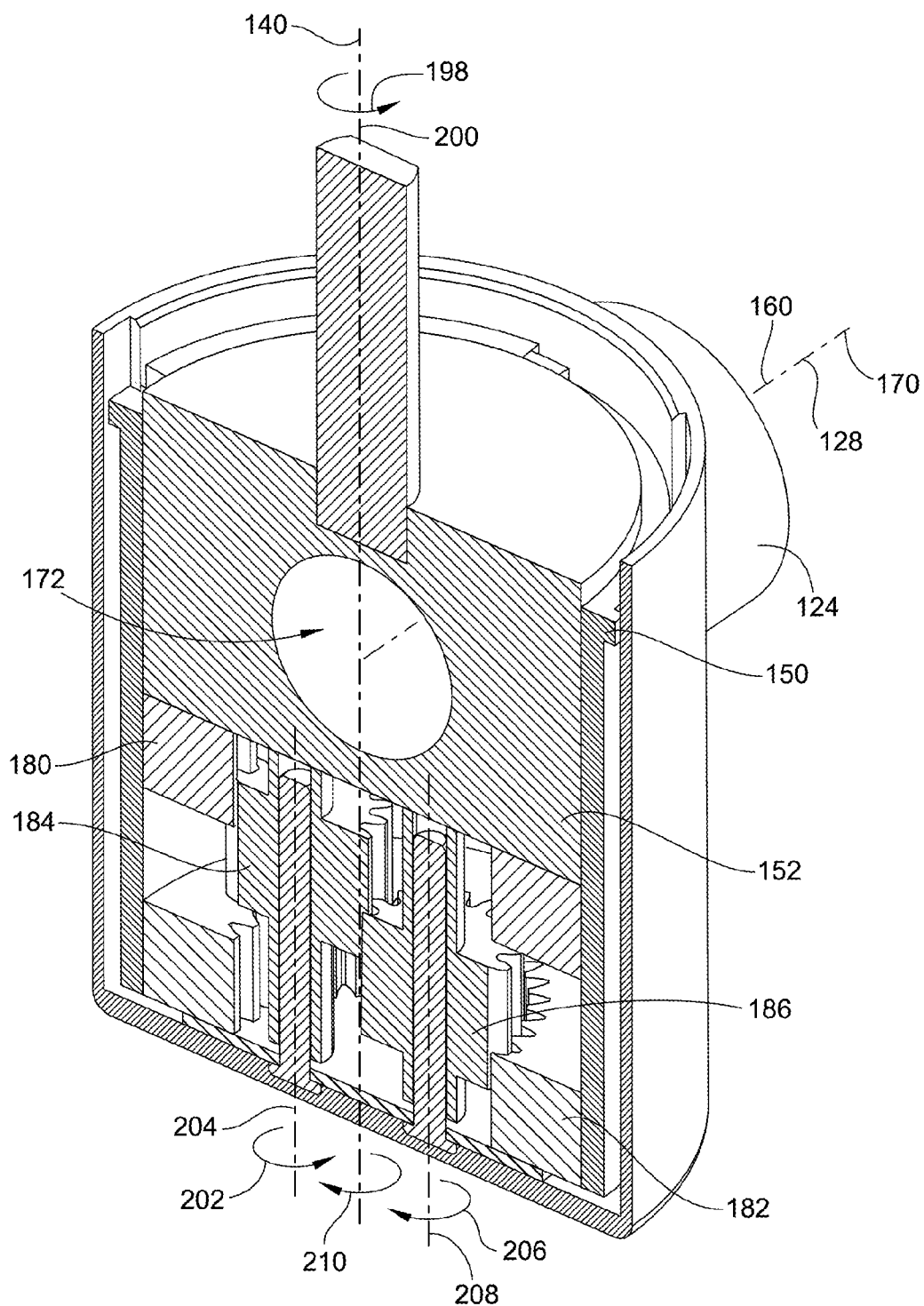
FIG. 9 is a perspective cross section of the valve of FIG. 7.

Turning now to FIG. 9, the mechanical interconnection between the first and second gear rings 180, 182 and the first and second pinions 184, 186 will now be described. As illustrated in FIG. 9, the outer and inner valve member axes 160, 170 are coincident with the flow path axis 128 such that the valve 120 is in a fully open position. To place the valve 120 in this position, the stem 132 is rotated in a first rotational direction 198 about an input axis 200 that is coincident with valve member axis 140.

This rotation causes a corresponding rotation in the inner valve member 152 as well as the first gear ring 180 fixedly connected thereto about the input axis 200 and the valve member axis 140. As a result, and due to the meshed contact between the first pinion 184 and the first gear ring 180, the first pinion 184 will rotate in a second rotational direction 202 about a first intermediary axis 204 centered on the first pinion 184.

The second pinion 186 is in meshed contact with the first pinion 184 such that rotation of the same causes the second pinion 186 to rotate in a third rotational direction 206 about a second intermediary axis 208. The second pinion 186 is also in meshed contact with the second gear ring 182. As a result, rotation of the second pinion 186 causes the second gear ring 182 to rotate in a fourth rotational direction 210.

From inspection of FIG. 9, it will be recognized that the first and second rotational directions 198, 202 are the same. Likewise, the third and fourth rotational directions 206, 210 are the same. Further, it will be recognized that the outer valve member 150 rotates in the fourth rotational direction 210 about an axis coincident with the input axis 200.

From a comparison of the embodiment illustrated at FIG. 3 with the embodiment illustrated at FIG. 9, it will be recognized that the input axis 200 is generally centered on the valve 120 as opposed to being offset, such as input axis 100 as shown in FIG. 3. Additionally, it will be recognized that the input torque applied at the input axis 200 is transferred directly to the inner valve member 152, as opposed to being transferred directly to the first pinion 84 of FIG. 3.

Figure 10:
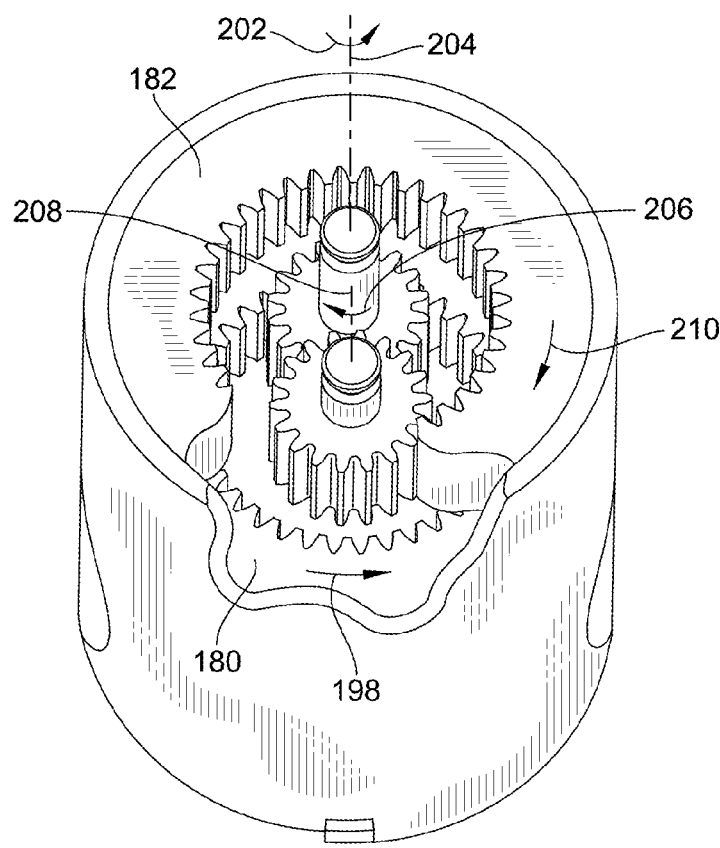
FIG. 10 is a perspective partially exposed view of a valve member arrangement and an actuation arrangement of the valve of FIG. 7.

Turning now to FIG. 10, the above described relative rotation between the first and second rings 180, 182 and first and second pinions 184, 186 is illustrated in greater detail. As indicated above, the first rotational direction 198 is the same as the second rotational direction 202 about the first intermediary axis 204. Likewise, the third rotational direction 206 about the second intermediary axis 208 is the same the fourth rotational direction 210. The particular rotational directions illustrated present those when moving from closed to open. It will be readily appreciated that these directions would be reversed when moving from open to closed.

Figure 11:
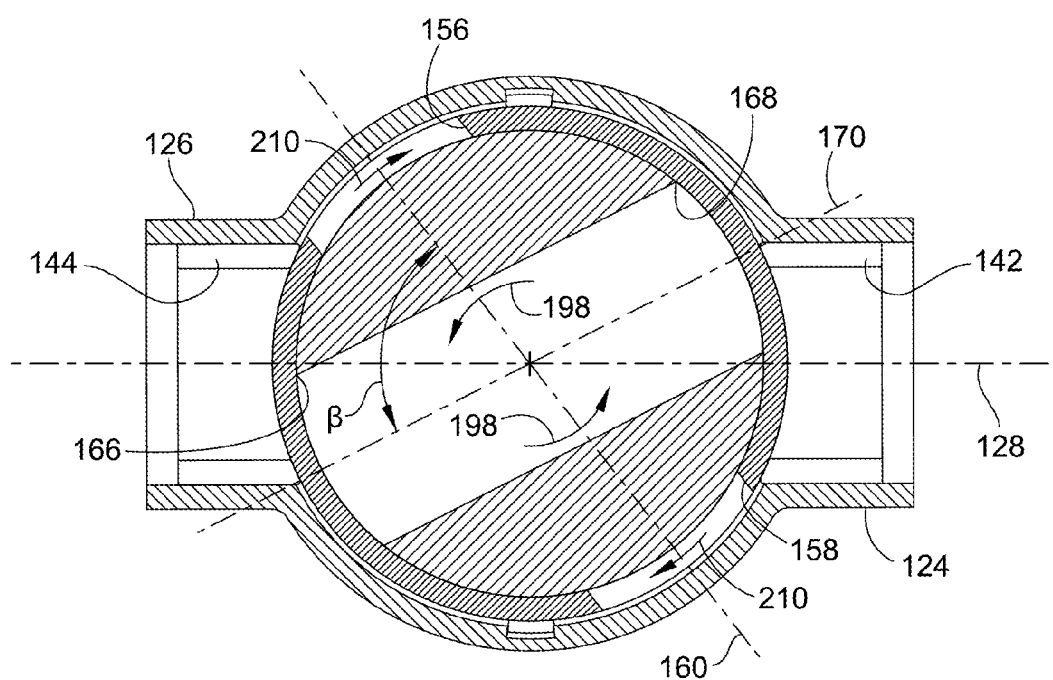
FIG. 11 is a top cross section of the valve of FIG. 7.

Referring now to FIG. 11, a description will be provided of the outer and inner valve members 150, 152 when in the closed position. As illustrated in FIG. 11, the outer and inner valve member axes 160, 170 are transverse to one another within an angle β therebetween, and transverse to the flow path axis 128. When in the fully closed position, the ports 156, 158 of the outer valve member are effectively closed off by the inner valve member 152. Similarly, the ports 166, 168 of the inner valve member are effectively closed off by the outer valve member 150. It is contemplated that the particular starting angle β between the outer and inner valve member axes 160, 170 is not limited to that shown. As one example, the axes 160, 170 may be coincident with one another and perpendicular to the flow path axis 128 in the fully closed position. The particular orientation of the axes 160, 170 in the fully closed or fully opened position is governed by the positioning of the outer and inner valve members 150, 152 relative to the actuation arrangement, and thus numerous configurations are contemplated.

However, as the inner and outer valve members 152, 150 are rotated about the first rotational direction 198 and fourth rotational direction 210 respectively, the outer valve member axis 160 and inner valve member axis 170 will move relative to one another such that the angle β formed therebetween is gradually decreased. As the angle β decreases, an opening will begin to form on center with the flow path axis 128 similar to that described above relative to FIG. 5. As the valve 120 moves from the closed position to the open position, this opening will increase in size in a similar or same manner as that shown at FIG. 6A-6D. As a result, flow through the valve 120 is generally straight along flow path axis 128 and centered thereon.

As was the case with the embodiment illustrated at FIGS. 1-6D, the valve 120 advantageously reduces the effects of turbulence, back pressure, and noise as a result of its straight through flow configuration. As a result, the valve 120 can be manufactured from light weight materials such as plastics or composites. However, the valve 120 can also be made from other materials such as brass or other metals equally as well. Indeed, the embodiments described herein advantageously overcome existing problems in the art by presenting a dual rotational valve member with an outer valve member and an inner valve member. The outer and inner valve members are configured to counter-rotate relative to one another such that flow through a valve incorporating the same is centered along a straight flow path axis between an inlet port and an outlet port thereof.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve, comprising:
    a housing having an inlet and an outlet, with a cavity therebetween;
    an outer valve member positioned within the cavity, the outer valve member having a pair of ports aligned about an outer valve member axis;
    an inner valve member positioned within the cavity, the inner valve member having a pair of ports aligned about an inner valve member axis;
    an actuation arrangement formed between the outer and inner valve members and operable to position the outer and inner valve members between a fully opened position to allow fluid flow through the valve and a fully closed position to prevent fluid flow through the valve, the actuation arrangement comprising a pair of gear rings axially spaced from one another along a valve member axis of the valve, each of the pair of gear rings circumscribing an interior space, the actuation arrangement further comprising a pair of pinions in meshed contact with one another and disposed within the interior space; and
    wherein the outer and inner valve member axes are generally transverse to one another in the fully closed position, and wherein the outer and inner valve member axes are coincident in the fully opened position.

2. The valve of claim 1, wherein a flow path extends between the inlet and the outlet, the flow path defining a flow path axis, wherein the outer and inner valve member axes are coincident with the flow path axis in the fully opened position.

3. The valve of claim 2, wherein the outer and inner valve member axes are generally transverse to one another in the closed position such that an angle is formed therebetween, the angle decreasing in magnitude as the valve moves from the fully open position to the fully closed position.

4. The valve of claim 3, wherein the outer and inner valve member axes are perpendicular to one another in the fully closed position.

5. The valve of claim 1, wherein the outer and inner valve member axes are perpendicular to the flow path axis and coincident with one another in the fully closed position.

6. The valve of claim 5, wherein the outer valve member is a hollow cylinder having a bore therethrough for receiving the inner valve member, and wherein the inner valve member has an outer periphery and the bore of the outer valve member defines an inner periphery of the outer valve member, the inner and outer peripheries in sliding contact with one another.

7. The valve of claim 6, wherein the housing has a valve seat, each of the outer and inner valve members have a bottom axial face, each bottom axial face in abutted contact with the valve seat.

8. The valve of claim 6, wherein the housing carries a plate that defines a valve seat, each of the outer and inner valve members have a bottom axial face, wherein the bottom axial face of the outer valve member contacts the valve seat, and wherein the bottom axial face of the inner valve member does not contact the valve seat.

9. A valve, comprising:
    a housing having an inlet and an outlet with a cavity therebetween;

an outer valve member positioned within the cavity;
an inner valve member positioned within the cavity;
an actuation arrangement having an input axis, the actuation arrangement mechanically coupled between the outer and inner valve members such that a torque applied to the input axis causes the outer valve member to rotate in a first direction and the inner valve member to rotate in a second direction opposite the first direction;
wherein the actuation arrangement includes a first gear ring and a second gear ring, the first gear ring fixedly mounted to the outer valve member, the second gear ring fixedly mounted to the inner valve member; and
wherein the actuation arrangement includes a first and a second pinion, the first pinion in meshed contact with the first gear ring, the second pinion in meshed contact with the first pinion and with the second gear ring.

10. The valve of claim 9, wherein the outer valve member has a bore extending axially therethrough, the bore defining an inner periphery of the outer valve member, the first gear ring fixedly mounted to the inner periphery of the outer valve member, and wherein the second gear ring is fixedly mounted to a top surface of the inner valve member such that it extends axially away from the inner valve member.

11. The valve of claim 9, wherein the outer valve member has a bore extending axially therethrough, the bore defining an inner periphery of the outer valve member, the first gear ring fixedly mounted to the inner periphery of the outer valve member, and wherein the second gear ring is fixedly mounted to a bottom surface of the inner valve member such that it extends axially away from the inner valve member.

12. The valve of claim 9, wherein application of the torque at the input axis rotates the first pinion and the first gear ring in a first direction, and wherein application of the torque at the input axis rotates the second pinion and the second gear ring in a second direction opposite the first direction.

13. The valve of claim 12, wherein a valve stem extends from the first pinion and defines the input axis such that the torque is applied directly to the first pinion.

14. The valve of claim 12, wherein a valve stem extends from the inner valve member and defines the input axis such that the torque is applied directly to the inner valve member.

15. A valve, comprising:
a housing having an inlet and an outlet with a cavity therebetween;
an outer valve member having a pair of ports and an axial bore extending therethrough, the outer valve member positioned within the cavity;
an inner valve member having a pair of ports, the inner valve member nested within the bore of the outer valve member and positioned within the cavity; and
an actuation arrangement mechanically coupled between the outer and inner valve members, the actuation arrangement operable to selectively align and misalign the pair of ports of the outer valve member with the pair of ports of the inner valve member, wherein the actuation arrangement comprises a first gear ring and a second gear ring, each of the first and second gear rings including radially inwardly directed gear teeth, the actuation arrangement further comprising a pair of pinions mechanically coupling the first gear ring to the second gear ring.

16. The valve of claim 15, wherein the outer and inner valve members counter-rotate to align and to misalign the pair of ports of the outer valve member with the pair of ports of the inner valve member.

17. The valve of claim 16, wherein a straight flow path extends between the inlet and the outlet and through the housing and defines a flow path axis, the flow path axis extending through each of the pair of ports of the outer valve member and each of the pair of ports of the inner valve member when each pair of ports are aligned.

18. The valve of claim 17, wherein an opening is formed at the inlet and the outlet by alignment of each of the pair of ports with one another, wherein the opening is centered on the flow path axis and increases in size as the valve transitions from a fully closed position to a fully opened position.

* * * * *